United States Patent [19]

Beckmann et al.

[11] Patent Number: 5,714,616
[45] Date of Patent: Feb. 3, 1998

[54] THIAZOLEMETHINE DYES

[75] Inventors: Stefan Beckmann, Bad Dürkhiem; Karl-Heinz Etzbach, Frankenthal; Rüdiger Sens, Mannheim, all of Germany

[73] Assignee: BASF Aktiengesellschaft, Ludwigshafen, Germany

[21] Appl. No.: 722,246

[22] PCT Filed: Apr. 12, 1995

[86] PCT No.: PCT/EP95/01348

§ 371 Date: Oct. 24, 1996

§ 102(e) Date: Oct. 24, 1996

[87] PCT Pub. No.: WO95/29958

PCT Pub. Date: Nov. 9, 1995

[30] Foreign Application Priority Data

Apr. 28, 1994 [DE] Germany ............ 44 14 882.8
Sep. 30, 1994 [DE] Germany ............ 44 34 990.4
Jan. 28, 1995 [DE] Germany ............ 195 02 702.7

[51] Int. Cl.$^6$ .................... C07D 277/587; C07D 417/12
[52] U.S. Cl. ..................... 548/146; 548/193; 546/165; 546/171
[58] Field of Search .................... 548/146, 193; 546/165, 171

[56] References Cited

FOREIGN PATENT DOCUMENTS 0 312 856 A1  7/1988  European Pat. Off. .
572898       12/1993  European Pat. Off. .
2732221       2/1979  Germany .
39 04 797 A1  8/1990  Germany .

OTHER PUBLICATIONS

Z. Naturforschg, 20 a, 1441–1471 (1965), W. Liptay.
J. Org. Chem., vol. 54, No. 16, 1989, 3775 to 3778, Determining Second–Order Polarizabilities, Paley, et al.
Chemistry & Industry, Oct. 1, 1990, Polymers for Non–Linear Optical Devices, Carole Jones, 600–608.
Wurthner et al., Chemical Physics 173 (1993) 305–314, North–Holland, Second–Order Polarizability of Donor–Acceptor Substituted Oligothiophenes: Substituent Variation and Conjugation Length Dependence.
Wortmann, et al., Chemical Physics 173 (1993) 99–108, North–Holland, Deviations from Kleinman Symmetry of the Second–Order Polarizability Tensor in Molecules with Low– Lying Perpendicular Electronic Bands.
J. Phys. Chem. (1992), 96, 9724–9730, Wortmann, et al., Electrooptical Absorption Measurements of Phototautomerizing Systems $S_0$ and $S_1$ Static Polarizabilities of Bipyridinediols.

*Primary Examiner*—Johann Richter
*Assistant Examiner*—Laura Cross Lutz
*Attorney, Agent, or Firm*—Oblon, Spivak, McClelland, Maier & Neustadt, P.C.

[57] ABSTRACT

Methine dyes of the formula I

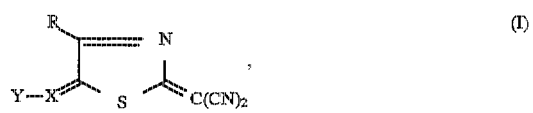

(I)

where

R is hydrogen, unsubstituted or substituted $C_1$–$C_{10}$-alkyl or unsubstituted or substituted phenyl, X is nitrogen or a radical of the formula $CQ^1$, $CH=CQ^1$—CH, $CH=CH$—$CH=CH$—CH,

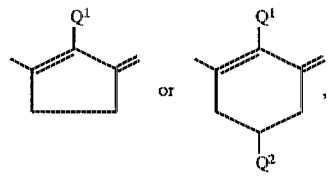

where $Q^1$ is hydrogen, $C_1$–$C_4$-alkyl, chlorine or bromine and $Q^2$ is hydrogen or $C_1$–$C_4$-alkyl, and Y is a radical of the aniline, aminonaphthalene, indole, aminoquinoline, aminothiazole or aminothiophene series, the use thereof in nonlinear optics, and novel thiazole derivatives.

6 Claims, No Drawings

THIAZOLEMETHINE DYES

This is a 371 of PCT/EP95/01348 filed Apr. 12, 1995.

The present invention relates to novel methine dyes of the formula I

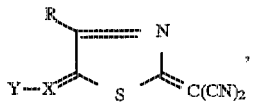
(I)

where

R is hydrogen, unsubstituted or substituted $C_1$–$C_{10}$-alkyl or unsubstituted or substituted phenyl, X is nitrogen or a radical of the formula $CQ^1$, $CH=CQ^1$—CH, $CH=CH$—$CH=CH$—CH,

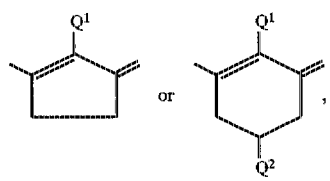

where $Q^1$ is hydrogen, $C_1$–$C_4$-alkyl, chlorine or bromine and $Q^2$ is hydrogen or $C_1$–$C_4$-alkyl, and Y is a radical of the aniline, aminonaphthalene, indole, aminoquinoline, aminothiazole or aminothiophene series, with the proviso that X is not CH when R is phenyl and Y is a radical of the aniline series, to the use thereof in nonlinear optics and to novel thiazole derivatives.

U.S. Pat. No. 5,364,919 discloses the use of methine dyes in polymeric nonlinear optical systems.

It is an object of the present invention to provide novel methine dyes which are advantageously suitable for use in polymeric nonlinear optical systems. In particular, dyes of this type ought to have large hyperpolarizability values, good thermal stability, good compatibility with the polymers used in nonlinear optical systems and good film-forming properties with copolymers.

We have found that this object is achieved by the methine dyes of the formula I defined at the outset.

Examples of suitable radicals Y are those of the formulae IIa to IIi

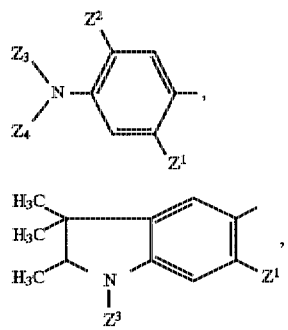
(IIa)

(IIb)

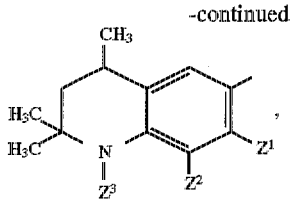
(IIc)

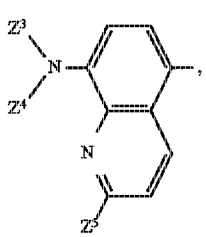
(IId)

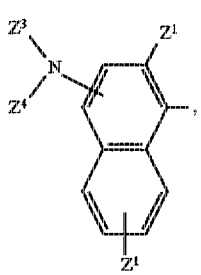
(IIe)

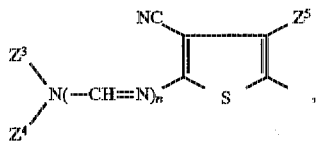
(IIf)

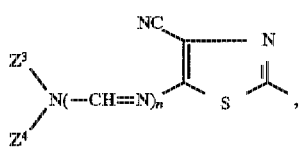
(IIg)

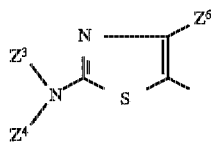
(IIh)

or

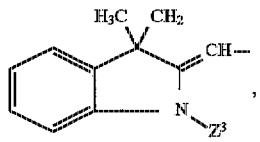
(IIi)

where n is 0 or 1, $Z^1$ is hydrogen, $C_1$–$C_{10}$-alkyl which may be interrupted by 1 or 2 oxygen atoms in ether functionalities, $C_1$–$C_4$-alkoxy, especially methoxy or ethoxy, $C_1$–$C_4$-alkylsulfonylamino, $C_1$–$C_4$-mono- or dialkylaminosulfonylamino or —NHCOZ$^7$ or —NHCO$_2$Z$^7$ where Z$^7$ is phenyl, benzyl, tolyl or $C_1$–$C_{10}$-alkyl which may be interrupted by 1 or 2 oxygen atoms in ether functionalities, $Z^2$ is hydrogen, $C_1$–$C_4$-alkyl, especially methyl, or $C_1$–$C_4$-alkoxy, especially methoxy or ethoxy, $Z^3$ and $Z^4$ are identical or different and are each, independently of one another, hydrogen, $C_1$–$C_{10}$-alkyl which may be substituted and may be interrupted by 1 or 2 oxygen atoms in ether functionalities, $C_3$–$C_4$-alkenyl, $C_5$–$C_7$-cycloalkyl, phenyl or tolyl or together with the nitrogen atom connecting them a 5- or 6-membered saturated heterocyclic radical which may contain further heteroatoms, $Z^5$ is halogen or unsubstituted or substituted phenyl and $Z^6$ is hydrogen, halogen, $C_1$–$C_{10}$-alkyl, unsubstituted or substituted phenyl, unsubstituted or substituted benzyl, cyclohexyl, thienyl, hydroxyl or $C_1$–$C_{10}$-monoalkylamino.

All the alkyl and alkenyl groups occurring in the abovementioned formulae may be either straight-chain or branched.

Examples of suitable substituents for substituted alkyl groups in the abovementioned formulae are, unless stated otherwise, cyano, phenyl, tolyl, hydroxyl, $C_1$–$C_6$-alkanoyloxy, acryloyloxy, methacryloyloxy, $C_1$–$C_4$-alkoxycarbonyl, $C_1$–$C_4$-alkylaminocarbonyloxy or $C_1$–$C_4$-alkoxycarbonyloxy, it being possible in the latter case for the alkoxy group to be substituted by phenyl or $C_1$–$C_4$-alkoxy. As a rule, the alkyl groups then have 1 or 2 substituents.

Examples of suitable substituents for substituted phenyl groups in the abovementioned formulae are halogen, $C_1$–$C_4$-alkyl, $C_3$–$C_7$-cycloalkyl, hydroxyl, $C_1$–$C_4$-alkoxy, $C_1$–$C_6$-alkanoyloxy, acryloyloxy or methacryloyloxy. As a rule, the phenyl groups then have 1 to 3 substituents.

Examples of suitable $Q^1$, $Q^2$, R, $Z^1$, $Z^2$, $Z^3$, $Z^4$, $Z^6$ and $Z^7$ radicals are methyl, ethyl, propyl, isopropyl, butyl, isobutyl, sec-butyl or tert-butyl.

Further examples of R, $Z^1$, $Z^3$, $Z^4$, $Z^6$ and $Z^7$ are pentyl, isopentyl, neopentyl, tert-pentyl, hexyl, 2-methylpentyl, heptyl, octyl, 2-ethylhexyl, isooctyl, nonyl, isononyl, decyl or isodecyl (the names isooctyl, isononyl and isodecyl are trivial names derived from the alcohols obtained by oxo synthesis, cf. Ullmann's Encyclopedia of Industrial Chemistry, 5th Edition, Vol. A1, pages 290 to 293, and Vol. A 10, pages 284 and 285).

Further examples of $Z^1$, $Z^3$, $Z^4$ and $Z^7$ are 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl or 4,8-dioxadecyl.

Further examples of R, $Z^3$ and $Z^4$ are benzyl, 2-methylbenzyl or 1- or 2-phenylethyl.

Further examples of R and $Z^6$, and examples $Z^5$, are phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-cyclopropylphenyl, 2-, 3- or 4-cyclobutylphenyl, 2-, 3- or 4-cyclopentylphenyl, 2-, 3- or 4-cyclohexylphenyl, 2-, 3- or 4-cycloheptylphenyl, 2-, 3- or 4-hydroxyphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,4-dichlorpphenyl, 2-, 3- or 4-acryloyloxyphenyl, 2,4-bis(acryloyloxy)phenyl, 2-, 3- or 4-methacryloyloxyphenyl, 2,4-bis(methacryloyloxy)phenyl, 2-, 3- or 4-hydroxyphenyl, 2-, 3- or 4-formyloxyphenyl, 2-, 3- or 4-acetyloxyphenyl, 2-, 3- or 4-propionyloxyphenyl, 2-, 3- or 4-butyryloxyphenyl or 2-, 3- or 4-isobutyryloxyphenyl.

Further examples of R, $Z^3$ and $Z^4$ are 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-dimethylaminocarbonyloxyethyl, 2-diethylaminocarbonyloxyethyl, 2- or 3-dimethylaminocarbonyloxypropyl, 2- or 3-diethylaminocarbonyloxypropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, 2-hydroxyethyl, 2- or 3-hydroxypropyl, 2- or 4-hydroxybutyl, 5-hydroxypentyl, 6-hydroxyhexyl, 7-hydroxyheptyl, 8-hydroxyoctyl, 2-acryloyloxyethyl, 2-methacryl-oyloxyethyl, 2- or 3-acryloyloxypropyl, 2- or 3-methacryloyloxypropyl, 2- or 4-acryloyloxybutyl, 2- or 4-methacryloyloxybutyl, 5-acryloyloxypentyl, 5-methacryloyloxypentyl, 6-acryloyloxyhexyl, 6-methacryloyloxyhexyl, 7-acryloyloxyheptyl, 7-methacryloyloxyheptyl, 8-acryloyloxyoctyl, 8-methacryloyloxyoctyl, cyclopentyl, cyclohexyl, cycloheptyl, allyl or methallyl.

Further examples of $Z^1$ and $Z^2$ are methoxy, ethoxy, propoxy, isopropoxy, butoxy, isobutoxy or sec-butoxy.

Examples of $Z^1$ radicals are methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

Further examples of $Z^5$ and $Z^6$ radicals are fluorine, chlorine or bromine.

Further examples of $Z^6$ radicals are benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

When $Z^3$ and $Z^4$ together with the nitrogen atom connecting them are a 5- or 6-membered saturated heterocyclic radical which may have further heteroatoms, possible examples thereof are pyrrolidinyl, piperidinyl, morpholinyl, piperazinyl or N-($C_1$–$C_4$-alkyl)piperazinyl.

Preferred methine dyes of the formula I are those where Y is derived from a component of the aniline, aminonaphthalene or aminoquinoline series, especially radicals of the formulae IIa to IIe.

Preference is further given to methine dyes of the formula I where X is nitrogen or a radical of the formula CH, CH=CH—CH or CH=CH—CH=CH—CH.

Preference is further given to methine dyes of the formula I where R is $C_1$–$C_6$-alkyl or unsubstituted or hydroxyl-, acryloyloxy- or methacryloyloxy-substituted phenyl.

Particularly interesting dyes of the formula I are those where Y is derived from a component of the aniline series, especially radicals of the formula IIa.

Particularly important dyes of the formula I are those where Y is a radical of the formula IIa, IIb or IIc, and especially worth mentioning is a radical of the formula IIa.

Further particularly important dyes of the formula I are those which have at least one polymerizable group, in particular an acryloyloxy or methacryloyloxy radical.

The present invention further provides thiazole derivatives of the formula IVa where W is hydrogen, $C_1$–$C_6$-alkanoyl, acryloyl or methacryloyl.

The methine dyes of the formula I can be prepared by conventional methods.

For example, an aldehyde of the formula III $$Y-L=O \quad (III),$$

where Y has the abovementioned meaning and L is a radical of the formula $CQ^1$, $CH=CQ^1-CH$, $CH=CH-CH=CH-CH$, where $Q^1$ and $Q^2$ each have the abovementioned meanings, can be reacted with a thiazole of the formula IV where R has the abovementioned meaning.

Those methine dyes of the formula I where X is nitrogen can be obtained for example by condensation of nitroso compounds of the formula V $$Y-NO \quad (V),$$

where Y is as defined above, or by oxidative coupling of amino compounds of the formula VI $$Y-NH^2 \quad (VI),$$

where Y is as defined above, with a thiazole IV.

The compounds of the formula IV, which include the thiazole derivatives of the formula Ira, are obtainable by reaction of ketones of the formula VII $$Hal-CH_2-CO-R \quad (VII),$$

where Hal is halogen and R is as defined above, with ammonium thiocyanate and malononitrile. Further details are also discernible from the Examples.

Those compounds of the formula I or IV where R is hydroxyphenyl (W=hydrogen in the formula IVa) can then be obtained for example by aqueous alkaline hydrolysis of those compounds in which R is alkanoyloxyphenyl (W=$C_1$–$C_6$-alkanoyl in the formula IVa).

The methine dyes of the formula I are advantageously suitable for use in nonlinear optics.

The compounds according to the invention are thermally stable and have particularly large molecular hyperpolarizability values ($\beta_0$). In addition, the dyes are very compatible with the polymers used in nonlinear optical systems and have good film-forming properties in copolymers.

The molecular hyperpolarizability can be determined, for example, by the solvatochromism method (see, for example, Z. Naturforschung 20a (1965) 1441–1471, or J. Org. Chem. 54 (1989) 3775–3778). This entails determination of the position of the absorption band of a compound in various solvents, eg. in dioxane and dimethyl sulfoxide. The shift in the absorption band is then directly proportional to the value of $\beta_0$, ie. compounds with a large solvatochromic shift have a large molecular hyperpolarizability and are therefore very suitable for use in nonlinear optical systems (see, for example, Chemistry and Industry (1990) 600–608).

The suitability of the novel substances in communications technology, in electrooptical modulators (eg. Mach-Zehnder interferometer), in optical switches, in frequency mixing or in waveguides should be particularly emphasized here.

The novel methine dyes of the formula I are also suitable in an advantageous manner, for example, for dyeing or printing textile materials. These are, for example, fibers or fabrics, in particular of polyesters, but also of cellulose esters or polyamides, or blended fabrics composed of polyesters and cellulose fibers or wool.

Furthermore, the novel methine dyes of the formula I are advantageously suitable for dyeing polymers in bulk, for use in electrophotography as dyes for electrostatic toners or as dyes for thermal transfer.

The Examples which follow illustrate the invention.

EXAMPLE 1 a) 154 g (1.0 mol) of chloroacetophenone were introduced into 800 ml of ethanol. Subsequently, 76 g (1.0 mol) of ammonium thiocyanate were added, and the mixture was boiled for 4 h. It was subsequently cooled to 20° C., and 66 g (1.0 mol) of malononitrile and 101 g (1.0 mol) of triethylamine were added. The reaction mixture was stirred at 20° C. for 12 h and then poured into 2000 ml of water, the mixture was acidified to pH 4 with glacial acetic acid, and the resulting precipitate was filtered off with suction. The product was dried at 50° C. under reduced pressure to obtain 131 g of the compound of the formula $C_{12}H_7N_3S$ (225) calc.: C 64.00 H 3.13 N 18.67 S 14.0 found: C 63.70 H 3.33 N 18.50 S 13.91 b) 1.61 g (0.1 mol) of 4-dimethylaminocinnamaldehyde and 2.25 g (0.01 mol) of the compound obtained under a) were heated at 80° C. in 35 ml of acetic anhydride for 2 h. After cooling to 20° C., the mixture was stirred at this temperature for a further 12 h. The resulting dye was filtered off with suction, washed with isopropanol and dried at 50° C. under reduced pressure to obtain 2.05 g of the compound of the formula

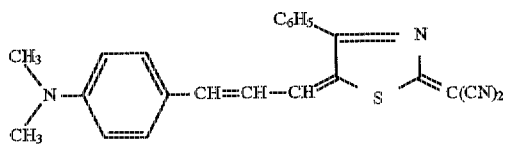

$C_{23}H_{18}N_4S$ (382) calc.: C 72.23 H 4.74 N 14.65 S 8.38 found: C 72.10 H 4.63 N 14.34 S 8.10

EXAMPLE 2

Example 2 was carried out as Example 1 but using 4-diethylaminocinnamaldehyde in place of the dimethylamino compound to obtain 3.30 g of the compound of the formula

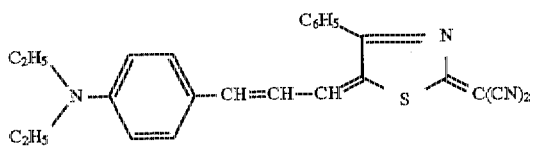

$C_{25}H_{22}N_4S$ (418) calc.: C 71.78 H 5.26 N 13.39 found: C 71.58 H 5.44 N 13.28

EXAMPLE 3

The procedure was as in Example 1 but using as aldehyde component the compound of the formula

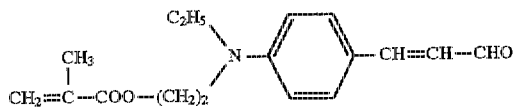

to obtain 3.08 g of the compound of the formula

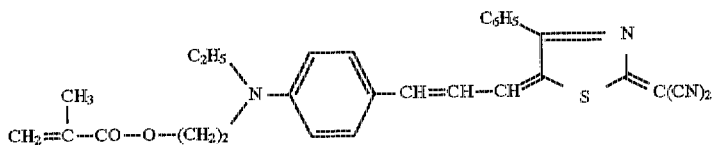

$C_{29}H_{26}N_4O_2S$ (495) calc.: C 70.42 H 5.30 N 11.33 O 6.47 found: C 70.63 H 5.43 N 11.53 O 6.60

EXAMPLE 4

The procedure was as in Example 1 but using as aldehyde component the compound of the formula

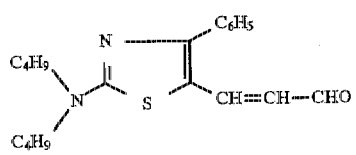

to obtain 3.5 g of the compound of the formula

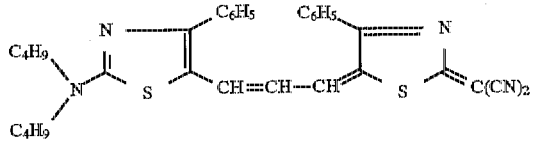

EXAMPLE 5 a) 3.41 g (0.02 mol) of ω-chloro-4-hydroxyacetophenone were dissolved in 100 ml of chloroform and admixed with 2 g of pyridine and 20 mg of 4-dimethylaminopyridine. 6 g (0.02 mol) of methacrylic anhydride were then added dropwise at 20° C. Thereafter the mixture was stirred at 50° C. for a further 1 h and then poured onto 500 g of water for hydrolysis. The organic phase was separated off, washed with water and then dried over potassium carbonate. Concentrating the organic phase under reduced pressure at 50° C. left the product as a solid residue, which was purified by recrystallization with ethanol to leave 3.08 g of the compound of the formula

calc.: C 60.50 H 4.62 O 20.17 found: C 60.45 H 4.70 O 20.07 b) 0.96 g (4 mmol) of the compound obtained under a) were introduced into a mixture of 10 ml of ethanol and 0.3 g (4 mmol) of ammonium thiocyanate. 20 mg of phenothiazine were added as stabilizer. The mixture was then heated at 50° C. for 4 h. Thereafter it was cooled down to 20° C., and the resulting residue was filtered off with suction and washed with water. The product was dried under reduced pressure at 50° C. to leave 0.81 g of the compound of the formula

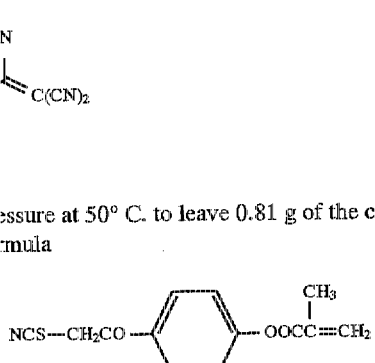

calc.: C 62.65 H 4.42 N 5.62 found: C 62.42 H 4.38 N 5.55.

c) 0.76 g (2.9 mmol) of the compound obtained under b) were suspended in 10 ml of ethanol and admixed with 20 mg of phenothiazine and 0.2 g of malononitrile. The mixture was then heated to 45° C. and admixed with 0.38 ml of triethylamine. After 1 h the mixture was cooled down to 20° C. and stirred at that temperature for 10 h. Thereafter the batch was poured onto 300 ml of dilute aqueous acetic acid, the mixture was subsequently stirred for 15 min, and the resulting precipitate was filtered off with suction. The product was washed neutral with 2,000 ml of water and dried under reduced pressure at 40° C. to leave 0.6 g of the compound of the formula

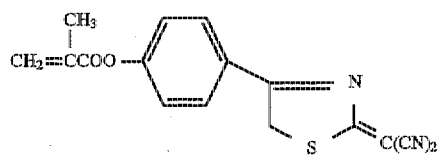

calc.: C 62.12 H 3.56 N 13.60 O 10.36 found: C 62.28 H 3.50 N 13.46 O 10.35 d) 2.03 g (0.01 mol) of 4-diethylaminocinnamaldehyde and 3.09 g (0.01 mol) of the compound obtained under c) were briefly heated to the boil in 30 ml of acetic anhydride. Thereafter the mixture was immediately cooled down to 0° C. and stirred at that temperature for 4 h. The resulting precipitate was filtered off with suction and washed with a little cold methanol to leave 3.5 g of the compound of the formula

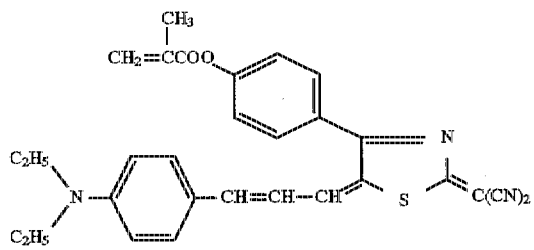

calc.: C 70.44 H 5.26 N 11.34 found: C 70.32 H 5.30 N 11.19

EXAMPLE 6 a) 12.8 g (0.075 mol) of 4-hydroxy-ω-chloroacetophenone were heated with 14 ml of acetic anhydride and 1 ml of concentrated sulfuric acid to 100° C. for 14 h. After the reaction solution had been cooled down, it was poured onto 200 ml of ice-water and the resulting solid was filtered off with suction to leave 14.8 g of the compound of the formula

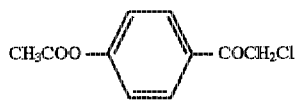

$C_{10}H_9O_3Cl$ (212.5) calc.: C 56.47 H 4.26 O 22.59 found: C 56.40 H 4.31 O 22.80 b) 10.4 g (0.044 mol) of the compound described under a) were heated with 50 ml of ethanol and 2.9 g (0.044 mol) of malononitrile to 40° C. The mixture was then cooled down to 20° C. and mixed with 5.5 ml of triethylamine. It was then stirred at 20° C. for 12 h, and acidified to pH 4 with glacial acetic acid, and the resulting solid was filtered off with suction. Washing with water and drying at 50° C. under reduced pressure left 10 g of the compound of the formula

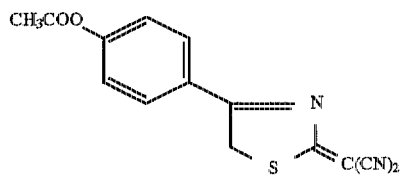

$C_{14}H_9N_3O_2S$ (283) mp.: >250° C. calc.: C 59.36 H 3.18 N 14.84 S 11.31 found: C 59.40 H 3.51 N 14.58 S 11.22 c) 28.3 g (0.1 mol) of the compound described under b) were heated with 23.8 g (0.1 mol) of 4-dibutylaminobenzaldehyde to the boil in 130 ml of acetic anhydride for 0.5 h. After cooling, the mixture was stirred at 20° C. for 12 h. The resulting dye was filtered off with suction, washed with 10 ml of xylene and 50 ml of methanol and dried at 50° C. under reduced pressure to leave 32 g of the dye of the formula

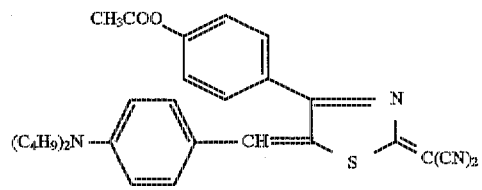

$C_{29}H_{30}N_4O_2S$ (498) mp.: 197° C.

d) 32 g (0.064 mol) of the dye described under c) were dissolved at 20° C. in a mixture of 400 ml of ethanol, 140 ml of water and 16.6 g (0.12 mol) of potassium carbonate. The mixture was then heated to the boil for 1 h. After cooling, the solvent was removed under reduced pressure, and the residue was suspended in 300 ml of water and acidified to pH 2.5 with 0.1N hydrochloric acid. The resulting precipitate was filtered off with suction, washed with 200 ml of water and dried at 50° C. under reduced pressure to leave 28 g of the dye of the formula

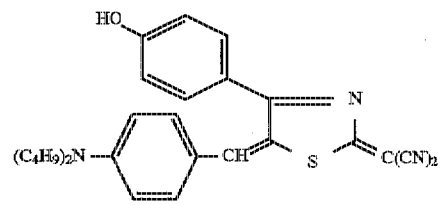

$C_{27}H_{28}N_4OS$ (456) calc.: C 71.10 H 6.14 N 12.28 O 3.51 found: C 69.5 H 6.32 N 12.10 O 5.83

EXAMPLE 7 a) 5.6 g (0.02 mol) of the compound described under 1b) and 3.5 g (0.02 mol) of 4-dimethylaminocinnamaldehyde were heated to 100° C. in 20 ml of acetic anhydride for 1 h. After cooling, the resulting precipitate was filtered off with suction and washed with 20 ml of xylene and 10 ml of methanol. Drying at 50° C. under reduced pressure left 2.4 g of the dye of the formula

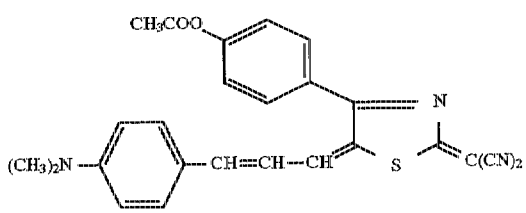

b) 1.2 g (2.7 mmol) of the dye described under a) were heated to the boil in a mixture of 20 ml of ethanol, 6 ml of water and 0.7 g of potassium carbonate for 1 h. After cooling, the solvent was distilled off under reduced pressure. The residue was suspended in 50 ml of water and acidified with 0.1N hydrochloric acid to pH 2.5. The resulting precipitate was filtered off with suction, washed with 50 ml of water and dried at 50° C. under reduced pressure to leave 0.95 g of the dye of the formula

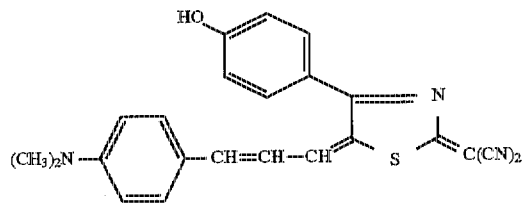

$C_{23}H_{18}N_4OS$ (398) calc.: C 69.35 H 4.52 N 14.07 found: C 69.10 H 4.63 N 14.02

The dyes listed in the following Table 1 were obtained similarly to the above examples.

TABLE 1

| Example No. | Formula |
| --- | --- |
| 8 | ![structure] |
| 9 | ![structure] |
| 10 | ![structure] |
| 11 | ![structure] |
| 12 | ![structure] |
| 13 | ![structure] |

TABLE 1-continued

| Example No. | Formula |
|---|---|
| 14 | (structure: 4-(methacryloyloxy)phenyl and 4-(dimethylamino)styryl substituted thiazole with C(CN)$_2$ group) |
| 15 | (structure: 4-(methacryloyloxy)phenyl and 4-(dibutylamino)styryl substituted thiazole with C(CN)$_2$ group) |
| 16 | (structure: 4-(acryloyloxy)phenyl and 4-(diethylamino)styryl substituted thiazole with C(CN)$_2$ group) |
| 17 | (structure: 4-(acryloyloxy)phenyl and 4-(dibutylamino)styryl substituted thiazole with C(CN)$_2$ group) |
| 18 | (structure: 4-hydroxyphenyl and 4-(diethylamino)styryl substituted thiazole with C(CN)$_2$ group) |
| 19 | (structure: 4-hydroxyphenyl and 4-(diethylamino)styryl substituted thiazoline with C(CN)$_2$ group) |
| 20 | (structure: 4-hydroxyphenyl and 4-(diethylamino)phenylimino substituted thiazole with C(CN)$_2$ group) |

TABLE 1-continued

| Example No. | Formula |
|---|---|
| 21 | (structure: 4-hydroxyphenyl and 4-(diethylamino)phenyl-CH=CH-CH=CH-CH= groups on a thiazole ring with =N-C(=C(CN)_2) substituent) |
| 22 | (structure with HO-C_6H_4-, C_6H_5, (C_4H_9)_2N-C(=S)-N= groups on thiazole with =N-C(=C(CN)_2)) |
| 23 | (structure similar to 22 with HO-C_6H_4- group) |
| 24 | (structure with CH_2=CH-COO-C_6H_4- group and (C_4H_9)_2N-C(=S)-N= on thiazole system) |
| 25 | (structure with CH_2=C(CH_3)-COO-C_6H_4- group and (C_4H_9)_2N-C(=S)-N= on thiazole system) |

The method described in Z. Naturforschung 20a (1965) 1441–1471 was used to determine the absorption maxima of each of the individual dyes in dioxane and dimethyl sulfoxide (DMSO), and then the solvatochromic shift $\Delta\tilde{\nu}$ [cm$^{-1}$] was determined.

The results of the measurements are listed in the following Table 2.

TABLE 2

| Dye Nr. | $\lambda_{max}$ (dioxane) [nm] | $\lambda_{max}$ (DMSO) [nm] | $\Delta\tilde{\nu}$ [cm$^{-1}$] |
|---|---|---|---|
| 1 | 636 | 746 | 2318 |
| 2 | 647 | 763 | 2350 |
| 3 | 645 | 765 | 2419 |
| 14 | 647 | 763 | 2350 |
| 15 | 645 | 762 | 2380 |

The suitability of the dyes according to the invention in nonlinear optics is furthermore shown by the determination of the hyperpolarizability ($\beta_0$) of the dye described in Example 2. The hyperpolarizability was determined by an electrooptical absorption measurement. The complete theory on this measurement method is to be found in Chem. Phys. 173 (1993) 305–314, Chem. Phys. 173 (1993) 99–108 and J. Phys. Chem. 96 (1992) 9724–9730. Besides the hyperpolarizability ($\beta_0$) the relevant variable important for polymeric nonlinear optical systems is $\mu_g\beta_0$ ($\mu_g$=dipole moment in the ground state) because $\mu_g\beta_0$ is directly proportional to the 2nd order susceptibility. The measured values are compared with those for dimethylaminonitrostilbene (DMANS) in the following Table 3.

TABLE 3

| Dye | $\beta_0$ [$10^{-50}$Cm$^3$V$^{-2}$] | $\mu_g\beta_0$ [$10^{-80}$C$^2$m$^4$V$^{-2}$] |
|---|---|---|
| Dye No. 2 | 95 | 4170 |
| DMANS | 33 | 820 |

The relevant variable $\mu_g\beta_0$ for the methine dye according to the invention is 5 times that for the compound disclosed in the literature, and this impressively underlines the suitability of the novel dyes in nonlinear optics.

We claim:

1. A methine dye of the formula I

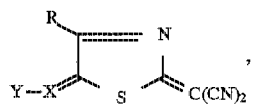

where

R is

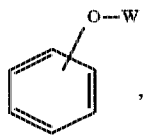

where W is hydrogen, $C_1$–$C_6$-alkanoyl, acryloyl or methacryloyl,

X is a radical of the formula CQ$^1$, CH=CQ$^1$—CH, CH=CH—CH=CH—CH,

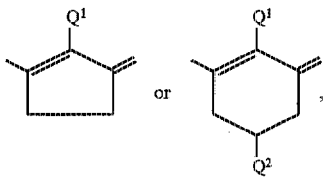

where Q$^1$ is hydrogen, $C_1$–$C_4$-alkyl, chlorine or bromine and Q$^2$ is hydrogen or $C_1$–$C_4$-alkyl, and Y is a a dye-imparting group containing a moiety selected from the group consisting of aniline, aminonaphthalene, indole, aminoquinoline and aminothiophene.

2. A methine dye as claimed in claim 1, wherein the moiety in Y is aniline, aminonaphthalene or aminoquinoline.

3. A methine dye as claimed in claim 1, wherein X is a radical of the formula CH, CH=CH—CH or CH=CH—CH=CH—CH.

4. A methine dye as claimed in claim 1, wherein the moiety in Y is aniline.

5. A thiazole derivative of the formula IVa

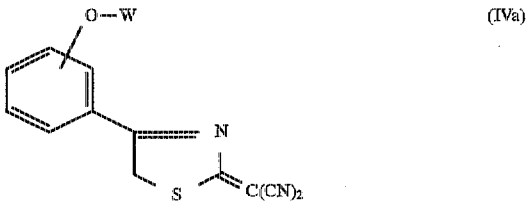

where W is hydrogen, $C_1$–$C_6$-alkanoyl, acryloyl or methacryloyl.

6. A process for dyeing a substrate comprising applying the methine dye of claim 1 to said substrate to effect dyeing thereof.

* * * * *